(12) United States Patent
Luo et al.

(10) Patent No.: US 9,734,586 B2
(45) Date of Patent: Aug. 15, 2017

(54) COLLISION PREDICTION

(71) Applicant: The Schepens Eye Research Institute, Inc., Boston, MA (US)

(72) Inventors: Gang Luo, Boston, MA (US); Eliezer Peli, Boston, MA (US); Shrinivas Pundlik, Boston, MA (US)

(73) Assignee: The Schepens Eye Research Institute, Inc., Boston, MA (US)

( * ) Notice: Subject to any disclaimer, the term of this patent is extended or adjusted under 35 U.S.C. 154(b) by 0 days.

(21) Appl. No.: 14/430,108

(22) PCT Filed: Sep. 20, 2013

(86) PCT No.: PCT/US2013/060973
§ 371 (c)(1),
(2) Date: Mar. 20, 2015

(87) PCT Pub. No.: WO2014/047465
PCT Pub. Date: Mar. 27, 2014

(65) Prior Publication Data
US 2015/0243044 A1   Aug. 27, 2015

Related U.S. Application Data

(60) Provisional application No. 61/704,410, filed on Sep. 21, 2012.

(51) Int. Cl.
*G06K 9/00* (2006.01)
*G06T 7/246* (2017.01)
*G06T 7/20* (2017.01)

(52) U.S. Cl.
CPC ............ *G06T 7/2033* (2013.01); *G06T 7/246* (2017.01); *G06K 9/00369* (2013.01);
(Continued)

(58) Field of Classification Search
CPC ......... G06T 2210/21; G06T 2219/2016; G06T 7/2033; G06T 7/246; G06T 2207/10016;
(Continued)

(56) References Cited

U.S. PATENT DOCUMENTS 4,257,703 A    3/1981  Goodrich
6,834,232 B1 * 12/2004  Malhotra ............... G08G 1/163
                                                                340/903
(Continued)

OTHER PUBLICATIONS

Alenya et al., "A Comparison of Three Methods for Measure of Time to Contact", IEEE Conference on Intelligent Robotics and Systems (IROS), Oct. 2009, St. Louis, US 2009.*
(Continued)

*Primary Examiner* — Kenny Cese
(74) *Attorney, Agent, or Firm* — Mintz Levin Cohn Ferris Glovsky and Popeo, P.C.

(57) ABSTRACT

In some implementations, there is provided a method. The method may include receiving data characterizing a plurality of digital video frames; detecting a plurality of features in each of the plurality of digital video frames; determining, from the detected features, a local scale change and a translational motion of one or more groups of features between at least a pair of the plurality of digital video frames; and calculating a likelihood of collision. Related apparatus, systems, techniques, and articles are also described.

13 Claims, 10 Drawing Sheets

(52) U.S. Cl.
CPC ..... *G06K 9/00805* (2013.01); *G06K 9/00825* (2013.01); *G06T 2207/10016* (2013.01); *G06T 2207/20076* (2013.01); *G06T 2207/30261* (2013.01); *G06T 2210/21* (2013.01); *G06T 2219/2016* (2013.01)

(58) Field of Classification Search
CPC .. G06T 2207/20076; G05D 2201/0213; G06K 9/00771; G06K 9/00362; G06K 9/00369; G06K 9/00805; G06K 9/00825; A63F 2300/643; B25J 9/1666; B25J 9/1676; G08B 13/19608; G05B 2219/40477
See application file for complete search history.

(56) References Cited

U.S. PATENT DOCUMENTS

| | | | | |
|---|---|---|---|---|
| 7,130,745 | B2 | 10/2006 | Sherony | |
| 2004/0197075 | A1* | 10/2004 | Aiso | G06T 3/40 386/264 |
| 2006/0291694 | A1* | 12/2006 | Venetianer | G06K 9/00771 382/103 |
| 2009/0010495 | A1* | 1/2009 | Schamp | B60R 21/0134 382/106 |
| 2011/0295548 | A1* | 12/2011 | Takabayashi | G06K 9/00798 702/142 |
| 2012/0314071 | A1* | 12/2012 | Rosenbaum | B60W 30/0956 348/148 |
| 2013/0141576 | A1* | 6/2013 | Lord | G08G 1/04 348/148 |
| 2013/0251194 | A1* | 9/2013 | Schamp | G06T 7/11 382/103 |

OTHER PUBLICATIONS

Colombo et al., "Generalized Bounds for Time to Collision from First-Order Image Motion", Dipartimento di Sestemi e Informatica.*
Chavez, Aaron et al., "Vision-Based Obstacle Avoidance Using SIFT Features," Advances in Visual Computing, Lecture Notes in Computer Science, vol. 5876 (2009):550-557.
De Croon, G.C.H.E. et al., "Time-to-Contact Estimation in Landing Scenarios Using Feature Scales," International Joint Conference on Artificial Intelligence, IJCAI 2011, http://www.esa.int/gsp/ACT/doc/AI/pub/ACT-RPR-AI-2011-TTC-IJCAI.pdf.
Mori, tomoyuki et al., "First Results in Detecting and Avoiding Frontal Obstacles from a Monocular Camera for Micro Unmanned Aerial Vehicles," IEEE International Conference on Robotics and Automation (ICRA) Karisruhe, German, May 6-10, 2013, 8 pages.
Nayak, Nakul et al., "Vision Based Collision Avoidance System for UAVs sublmitted to Robotics Vision Capstone, Prof K Dana," http://www.ece.rutgers.edu/~kdana/Capstone2013/capstone2013/uavreport.pdf (2013), 12 pages.
Negre, Amaury et al., "Real-time Time-to-Collision from variation of Intrinsic Scale," Experimental Robotics, Springer Tracts in Advanced Robotics, vol. 39 (2008):75-84.
Pundlik, Shrinivas et al., "Collision Detection for Visually Impaired from a Body-Mounted Camera," IEEE Conference on Computer Vision and Pattern Recognition Workshops, (2013):41-47.
Pundlik, Shrinivas et al., "Time to Collision and Collision Risk Estimation from Local Scale and Motion," Advances in Visual Computing, Lecture Notes in Computer Science, vol. 6938 (2011):728-737.
Colombo, C., DelBimbo, A.: Generalized Bounds for Time to Collision from First-Order Image Motion. In: IEEE International Conference on Computer Vision, pp. 220-226 (1999).
Muller, D., Pauli, J., Nunn, C., Gormer, S., Muller-Schneiders, S.: Time to Contact Estimation Using Interest Points. IEEE Conference on Intelligent Transportation Systems, pp. 1-6 (2009).

Ancona, N., Poggio, T.: Optical Flow from 1D Correlation: Application to a simple Time-To-Crash Detector. International Journal of Computer Vision 14,131-146 (1995).
Alenya, G., Negre, A., Crowley, J.L.: A Comparison of Three Methods for Measure of Time to Contact. In: IEEE/RSJ Conference on Intelligent Robots and Systems, pp. 1-6 (2009).
Meyer, F.G.: Time-to-Collision from First-Order Models of the Motion Field. IEEE Transactions on Robotics and Automation 10,792-798 (1994).
Horn, B.K.P., Fang, Y., Masaki, I.: Time to Contact Relative to a Planar Surface. IEEE Intelligent Vehicle Symposium, pp. 68-74 (2007).
Horn, B.K.P., Fang, Y., Masaki, I.: Hierarchical framework for direct gradient-based time-tocontact estimation. In: IEEE Intelligent Vehicle Symposium, pp. 1394-1400 (2009).
Lourakis, M., Orphanoudakis, S.: Using Planar Parallax to Estimate the Time-to-Contact. In: IEEE Conference on Computer Vision and Pattern Recognition, vol. 2, pp. 640-645 (1999).
K. Mikolajczyk and C. Schmid. A Performance Evaluation of Local Descriptors. In: IEEE Transactions on Pattern Analysis and Machine Intelligence, 27(10), pp. 1615-1630, (2005).
Lee, D.N.: A theory of visual control of braking based on information about time-to-collision. Perception 5,437-459 (1976).
R.C. Nelson and J. Aloimonos, "Using Flow Field Divergence for Obstacle Avoidance: Towards Qualitative Vision", IEEE International Conference on Computer Vision, 1988.
D. Regan and S. Kaushal, "Monocular Discrimination of the Direction of Motion in Depth", Vision Research, vol. 34, pp. 163-177, Jan. 1994.
Shi, J., Tomasi,C.: Good Features to Track. In: IEEE Conference on Computer Vision and Pattern Recognition, pp. 593-600 (1994).
Edward Rosten and Tom Drummond: Fusing Points and Lines for High Performance Tracking. In: IEEE International Conference on Computer Vision. pp. 1508-1511, (2005).
Comaniciu, Dorin; Peter Meer. In: Mean Shift: A Robust Approach Toward Feature Space Analysis. IEEE Transactions on Pattern Analysis and Machine Intelligence 24 (5), pp. 603-619 (2002).
Davison, Molton, Reid, and Stasse: MonoSLAM: Real-Time Single Camera SLAM. In: IEEE Transactions on Pattern Analysis and Machine Intelligence, 2007, pp. 1052-1067.
Tresilian, J.R.: Visually timed action: time-out for 'tau'? Trends in Cognitive Sciences 3, 301-310 (1999).
Luo, G., Woods, R., Peli, E.: Collision Judgment When Using an Augmented-Vision Head-Mounted Display Device. Investigative Ophthalmology and Visual Science 50, 4509-4515 (2009).
Negre, Amaury et al., "Scale Invariant Segment Detection and Tracking," Proc. of the Int. Symp. on Experimental Robotics (2008).
Harris, C., Stephens, M.: A Combined Corner and Edge Detector. In: Alvey Vision Conference. pp. 147-151, (1988).
Edward Rosen and Tom Drummond: Machine learning for high-speed corner detection. In: European Conference on Computer Vision. pp. 430-433, (2006).
B. K. P. Horn and B. G. Schunck: Determining Optical Flow. In. Artificial Intelligence. 17: pp. 185-203 (1981).
Lowe, D.G.: Distinctive Image Features From Scale-Invariant Keypoints. International Journal of Computer Vision. 60 pp. 91-110 (2004).
Herbert Bay, et al.: SURF: Speeded-Up Robust Features. In: Computer Vision and Image Understanding. 110(3) pp. 346-359 (2008).
B. D. Lucas and T. Kanade: An Iterative Image Registration Technique with an Application to Stereo Vision. In: Proceedings of Imaging Understanding Workshop, pp. 121-130, (1981).
Martin A. Fischler and Robert C. Bolles.: Random Sample Consensus: A Paradigm for Model Fitting with Applications to Image Analysis and Automated Cartography. In: Comm. of the ACM 24 (6): pp. 381-395 (1981).
Cipolla, R., Blake, A.: Surface Orientation and Time to Contact from Image Divergence and Deformation. In: Sandini, G. (ed.) ECCV 1992. LNCS, vol. 588, pp. 187-202. Springer, Heidel-berg (1992).

(56) References Cited

OTHER PUBLICATIONS

Camus, T.A.: Calculating Time-to-Contact Using Real-Time Quantized Optical Flow. Max Planck-Institute for Biologische Kybemetik Technical Report (1995).
Negre, A., Braillon, C., Crowley, J.L., Laugier, C.: Real-time Time-To-Collision from variation of Intrinsic Scale. In: Proceedings of the International Symposium on Experimental Robotics, pp. 75-84 (2006).

* cited by examiner

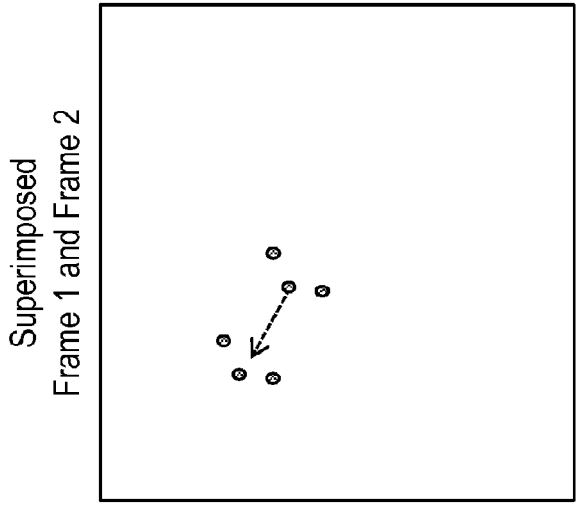
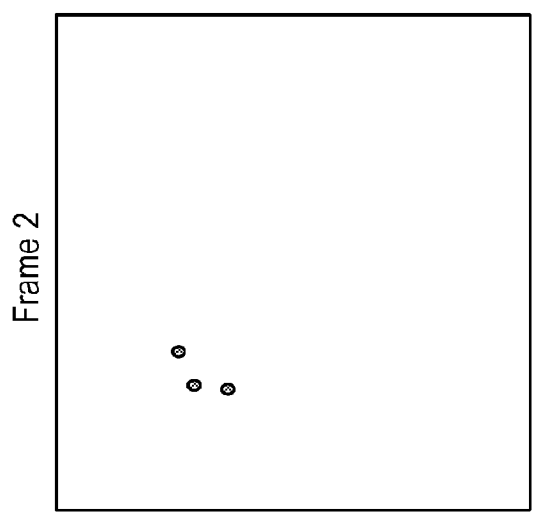
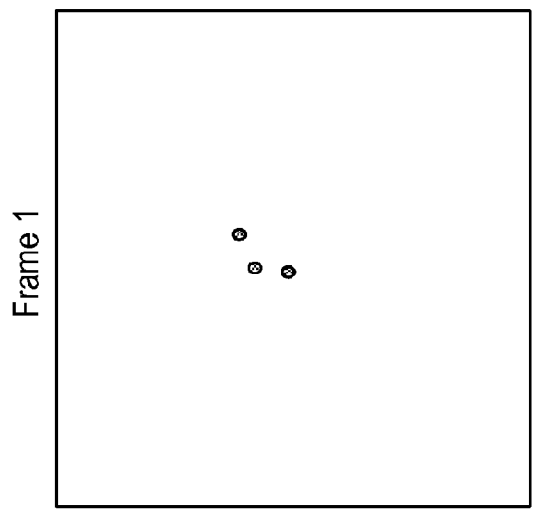
FIG. 2

COLLISION PREDICTION

RELATED APPLICATIONS

This application is a national stage application, filed under 35 U.S.C. §371, of International Application No. PCT/US2013/060973, filed on Sep. 20, 2013, which claims priority under 35 U.S.C. §119 to U.S. Provisional Application No. 61/704,410 filed Sep. 21, 2012, the contents of which are hereby incorporated by reference in its entirety.

STATEMENT OF FEDERALLY SPONSORED RESEARCH

This invention was made with government support under W81XWH-10-1-0980 awarded by the Department of Defense. The government has certain rights in the invention.

TECHNICAL FIELD

The subject matter described herein relates to prediction of collision between objects, one or more of which may be moving, using computer and/or machine vision.

BACKGROUND

Computer vision is a field that includes methods for acquiring, processing, analyzing, and understanding images and, in general, high-dimensional data from the real world in order to make decisions. Related to artificial intelligence, computer vision aims to duplicate the abilities of human vision by electronically perceiving and understanding an image. This image understanding usually involves mathematical models constructed with the aid of geometry, physics, statistics, and learning theory.

Applications range from tasks such as industrial machine vision systems (for example, inspecting patterned silicon wafers during production for manufacturing defects) to research into artificial intelligence and computers or robots that can comprehend the world around them. Machine vision usually refers to a process of combining automated image analysis with other methods and technologies to provide automated inspection and robot guidance. One example of machine vision is a system mounted to a moving vehicle that includes a video camera and, by analyzing video frames, generates warnings when the vehicle is in immediate danger of being involved in a collision.

SUMMARY

In one aspect, there is provided a method. The method may include receiving data characterizing a plurality of digital video frames; detecting a plurality of features in each of the plurality of digital video frames; determining, from the detected features, a local scale change and a translational motion of one or more groups of features between at least a pair of the plurality of digital video frames; and calculating a likelihood of collision.

In some variations, one or more of the features disclosed herein including the following features can optionally be included in any feasible combination. The local scale change may characterize a difference in an area defined by a convex hull of the one or more groups of features. The translational motion may characterize a difference in position of the one or more groups of features. The translational motion may be compensated based on the received data, wherein the received data further characterizes a motion of a camera, the motion being associated with the plurality of digital video frames. One or more groups of features may be classified as being on a collision trajectory by comparing a collision point with a predetermined value defining a safety envelope around a camera.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a diagram illustrating an example of translational motion for detected features in two successive frames;

FIG. 10A is a plot showing a comparison of estimated TTC with ground truth TTC value for a case where the person approaches the camera head-on;

DETAILED DESCRIPTION

Risk of collision between objects, one or more of which may be moving, can be assessed from a series of images (e.g., successive frames of a video) by estimating a point (e.g., with respect to a video camera) where the collision is likely to occur (or pass-by the camera) and estimating a time to collision. A trajectory of an object can also be determined and used to assess risk collision. The estimated point of collision can be determined because objects on a collision trajectory tend to have lower translational motion (as measured from the reference of the camera) relative to a local scale change and vice versa. In other words, objects on a collision trajectory (e.g., with a high collision risk) stay in the field of view and get larger, whereas objects not on a collision trajectory may get larger, but also move towards the edge of (and may eventually leave) the field of view. By measuring translational motion of objects and scale (e.g., size) change between successive images, the collision point, and/or a risk of collision can be determined (e.g., estimated, and the like).

Collision prediction can be used in systems for collision warning and collision avoidance. For example, moving vehicles such as cars, bicycles, airplanes, and watercraft, such as boats and submarines, can benefit from collision warning and avoidance systems. Other systems such as robotic systems or wearable devices that aid individuals with vision impairment can benefit from collision warning and avoidance systems. For example, a video camera can be mounted to a moving vehicle (e.g., an automobile) and, using images acquired from the video camera, a likelihood that objects (e.g., pedestrians, other vehicles, and the like) will collide with the moving vehicle can be determined.

The current subject matter can be used to aid individuals with vision impairment maneuver without colliding with objects. For example, when walking through a crowd, crossing the street, and the like. The current subject matter can be associated with a pair of glasses or other wearable devices that provide an auditory warning to the wearer if a collision in imminent.

Figure 1:
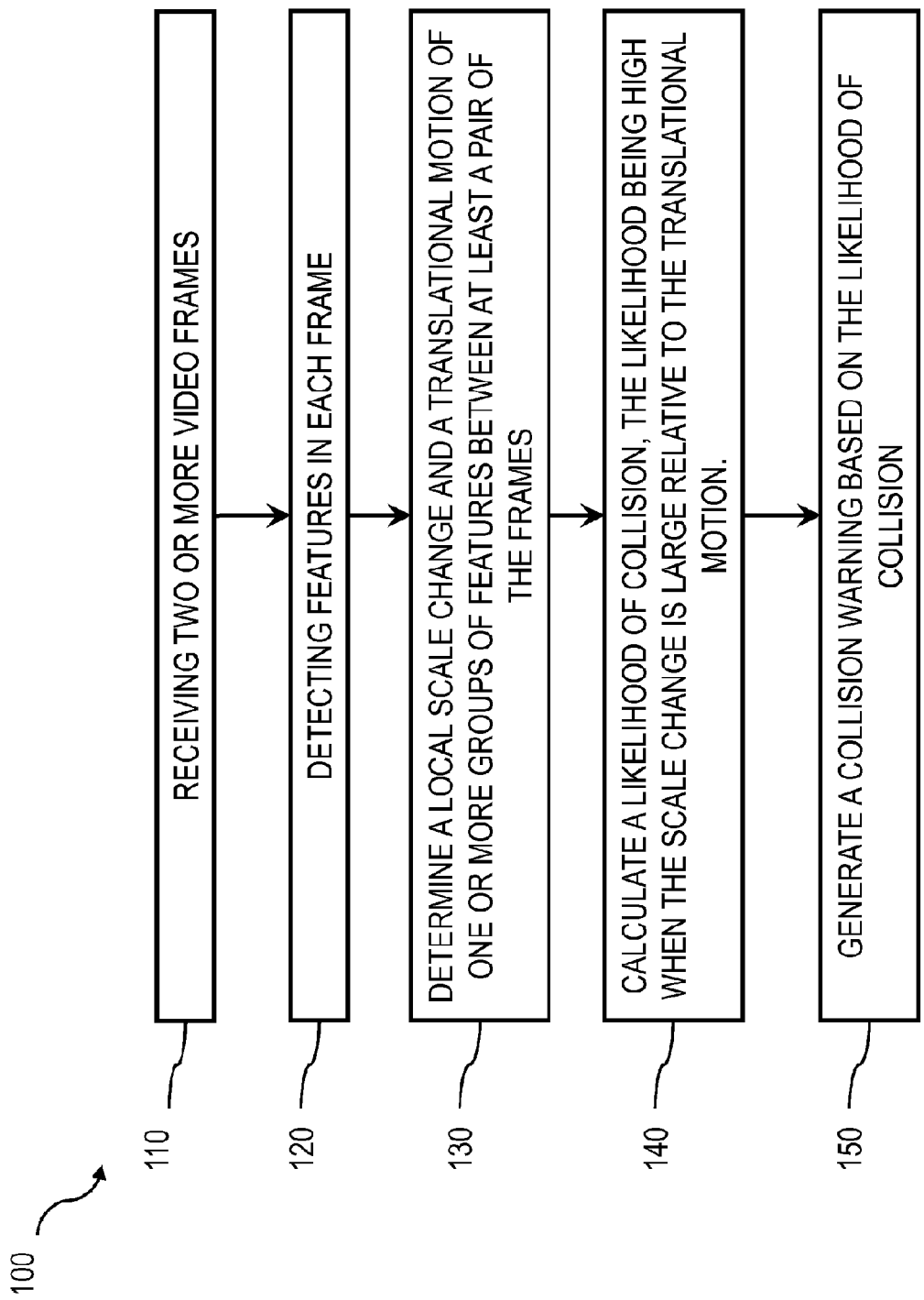
FIG. 1 is a process flow diagram of an example method for determining a likelihood of collision.

FIG. 1 is a process flow diagram of an example process 100 for determining a likelihood of collision. At 110, a plurality of video frames or images can be received. The frames can be digital images received from a monocular video camera or other visual inspection device such as a charge coupled device (CCD).

At 120, image features can be detected in each frame or image. Features can be locations within the image that satisfy some shape, structure, contrast, and/or color criterion. For example, features can include specific structures in the image ranging from simple structures such as points or lines (e.g., edges) to more complex structures such as image descriptors that can be produced by applying various image transforms. Features can include points, such as Harris corners (Harris, C., Stephens, M.: A combined corner and edge detector. In: Alvey Vision Conference. pp 147-151, (1988)), Good Features (Shi, J., Tomasi, C.: Good Features to Track. In: IEEE Conference On Computer Vision And Pattern Recognition, pp. 593-600 (1994)), or FAST features (Edward Rosten and Tom Drummond: Machine learning for high-speed corner detection. In: European Conference on Computer Vision. pp. 430-433, (2006)), which are small image patches with high intensity gradients in two spatial dimensions, although other feature types may be used as well.

Features can be tracked from one frame to another. For example, when a position change of objects from one frame to the next is small (e.g., the inter-frame motion is small and the overall brightness is the same) or the features share a characteristic such as appearance. Additionally, features can be associated into groups. For example, when they are associated with the same object. Grouping can be performed, for example, when features share a characteristic such as appearance, motion, spatial position, temporal position, and/or spatiotemporal position.

At 130, a local scale change and a translational motion of one or more features (or groups of features) can be determined Translational motion can be represented by a shift in position of a feature or group of features between frames. Translational motion can be determined by computing a difference in position (e.g., in number of pixels, ground distance, and the like) between frames. FIG. 2 illustrates an example of translational motion for detected features in two successive frames. In the illustrated example, the camera is stationary and three features are detected in each of frame 1 and frame 2 (the features can be associated with the same object, for example, if an object moving between the frames is a small ball). The translational motion can be the average difference in pixel position of the features between each frame, as illustrated by the dotted arrow (e.g., vector representation) in the super-imposed frame 1 and frame 2. Multiple features detected in frames can be grouped, and their translational motion can represent the motion of the grouping of features. For example, the translational motion for the group of features can be the average of the translational motion of each feature in the group or the difference in pixel position of a center of mass of the group of features.

Figure 3:
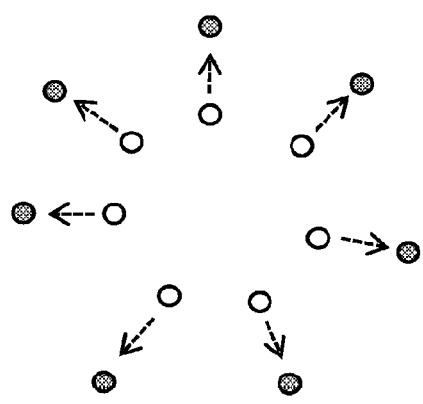
FIG. 3 illustrates local scale change of an example group of features and includes two superimposed frames, each frame including a group of detected features.

The local scale change represent whether, from the perspective of the camera, an object is getting larger or smaller. The local scale change can be determined from detected features by, for example, computing a rate of expansion of a group of features between frames. FIG. 3 illustrates local scale change of an example group of features and includes two superimposed frames, each frame including a group of detected features. The translational motion of each detected feature is shown by dotted arrows. The local scale change can be computed as, for example, the average position change (e.g., rate of expansion) of each of the features from a center of mass (e.g., the average position of the group of features).

Figure 4:
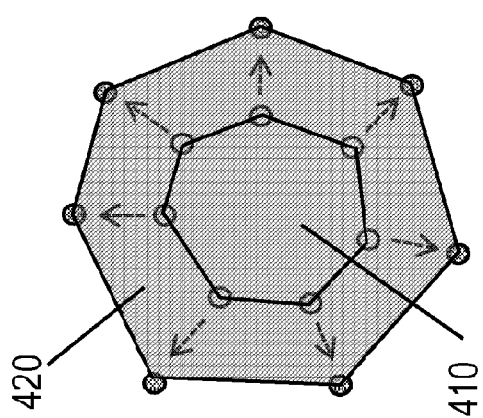
FIG. 4 illustrates the area covered by a convex hull of the features in frame 1, and the area covered by a convex hull of the features in frame 2.

As another example, the local scale change can be determined from detected features by, for example, a ratio of the distance or area of an image covered by a feature group between frames. For example, FIG. 4 illustrates the area covered by a convex hull of the features in frame 1 at 410, and the area covered by a convex hull of the features in frame 2 at 420. The local scale change can be a ratio of the two areas.

The local scale change can be determined using algorithms such as image area moments, motion field, affine shape parameters, and the like. A feature or group of feature groups can be tracked or associated together between frames to be used in determining the local scale change and translational motion.

Figure 5:
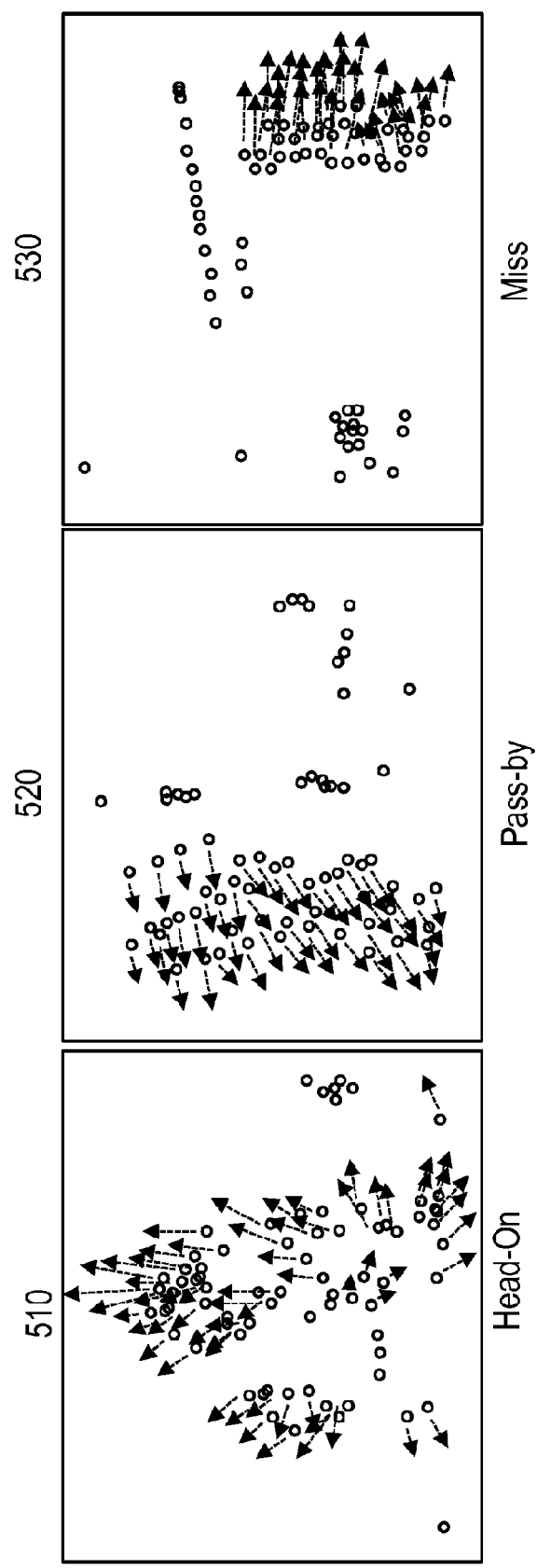
FIG. 5 is a series of plots depicting motion patterns obtained for three hypothetical cases: object approaching for a head-on collision/hit, object approaching for a near miss/pass-by, and object approaching with no collision/miss.

As further examples of features, translational motion, and local scale change, FIG. 5 is a series of plots depicting example features and motion patterns obtained for three hypothetical cases. For each motion pattern, two successive images are acquired and features are identified as described above. The features for the first of the two successive images are shown as circles. The arrows in FIG. 5 illustrate the motion or position change of each feature between images (e.g., a vector representation of the motion between images of each feature). The arrows can be computed by determining a difference in position of the associated features between images. At 510, an object is on a head-on collision trajectory. The features (and arrows) do not have a large translational motion between images, but are expanding (e.g., area of the image covered by a grouping of the features increases). In other words, the features are not, as a group, moving towards an edge of the image but rather are spreading apart (e.g., covering a larger area of the image).

At 520, an object is passing by the camera but is not on a collision course. From one image to the next, features are moving, as a group, towards an edge of the image and the relative expansion is limited (e.g., the feature group covers a similar area of the image). The object may not collide with the camera. In 520, the object is moving to the left of the camera; however, the current subject matter could apply to an object moving towards any edge of the field of view (e.g., for an object passing above or below the camera).

At 530, an object is moving parallel to the camera with little or no risk of collision. Feature translation is large relative to the two previous examples (illustrated at 510 and 520), with limited relative expansion.

Referring again to FIG. 1, a likelihood of collision can be calculated at 140. The likelihood can be high when the local scale change is large relative to the translational motion and can be low when the local scale change is not large relative to the translational motion. As a result, potential obstacles, as represented by groups of features, on a collision trajectory undergo a positive local scale change (e.g., expansion) relative to their shifting motion (e.g., translational speed). For example, the likelihood of collision can be a ratio between measures of scale change and translational motion.

The likelihood of collision can be used to represent a collision point. For example, the collision point can be the ratio of local scale change and lateral motion, or can be computed as the difference between a collision trajectory and the camera center. For example, collision point s can be determined by:

$$s = \frac{\Delta\varphi}{\Delta W} \cdot \frac{A}{d} - \frac{W\cos\varphi}{2f - W\sin\phi}$$

where A/d is the angular size of the object, W is the size of the object on the image sensor, ΔW is the rate of scale change, φ is the visual direction of the object, Δφ is the translation speed of the object, f is the camera focal length.

At 150, a collision warning can be generated or provided based on the likelihood of collision. The likelihood of collision can be compared to a predetermined, predefined, and/or preselected threshold, and the warning can be generated and/or provided if the likelihood is greater than the threshold. The providing can include displaying, transmitting, persisting, and/or causing an auditory alarm to sound or presenting other stimuli. For example, an alarm can sound or a bell can ring if the likelihood of collision exceeds, for example, 0.5. Additionally, the threshold can be tailored to different collision scenarios for different applications.

Time to collision can be determined based on the scale change. For example, the time to collision can be the inverse of the local scale change and can be determined in a unit of frames-until-collision. It can be converted to seconds using the video frame rate. The collision point, time to collision, and their corresponding thresholds can be combined to include a concept of a temporal-spatial zone around the camera, (e.g., a collision envelope or a safety zone around the camera). For example, collision point within the safety zone (or any object trajectory with a likelihood to penetrate the safety zone) can be considered risky. Additionally, features or groups of features can be classified, based on the likelihood of collision, as being on a collision trajectory or a miss trajectory. A trajectory can be determined relative to the camera center at a camera plane.

Feature tracking trajectories can provide a measure of image motion between any two given frames. This image motion information can be sparse in nature, unlike dense motion fields produced by some optical flow methods, which are based on the Horn & Schunck algorithm (B. K. P. Horn and B. G. Schunck: Determining Optical Flow. In: Artificial Intelligence. 17: pp. 185-203 (1981)). Image descriptors such as SIFT (scale invariant features) (Lowe, D. G.: Distinctive image features from scale-invariant keypoints. International Journal of Computer Vision. 60 pp. 91-110 (2004)), GLOH (gradient localization and orientation histogram) (K. Mikolajczyk and C. Schmid A performance evaluation of local descriptors. In: IEEE Transactions on Pattern Analysis and Machine Intelligence, 27(10), pp. 1615-1630, (2005)), and SURF (speed up robust features) (Herbert Bay, et al.: SURF: Speeded Up Robust Features. In: Computer Vision and Image Understanding. 110(3) pp. 346-359 (2008)) also rely on image gradients like feature points and could be used as alternative to feature points. For example gradients around a point can be sampled in a histogram, which can be made invariant to rotation, scaling, and other image deformations (such as affine invariance). These descriptors can be matched to determine the transformation of the keypoint between two frames. Tracking can include the Lucas-Kanade algorithm (B. D. Lucas and T. Kanade: An iterative image registration technique with an application to stereo vision. In: Proceedings of Imaging Understanding Workshop, pp. 121-130, (1981)), block matching methods, and/or fast feature matching (Edward Rosten and Tom Drummond: Fusing points and lines for high performance tracking. In: IEEE International Conference on Computer Vision. pp. 1508-1511, (2005)), although other tracking approaches can be used as well.

Features can be associated into groups. Feature grouping can provide insight into object localization and scene understanding. Features can be grouped based on various criteria such as appearance, motion in 2D or 3D, spatial, temporal or spatiotemporal position. Some example approaches for feature grouping can include RANdom SAmple Consensus (RANSAC) (Martin A. Fischler and Robert C. Bolles.: Random Sample Consensus: A Paradigm for Model Fitting with Applications to Image Analysis and Automated Cartography. In: Comm of the ACM 24 (6): pp. 381-395 (1981)), k-means, and mean-shift algorithm (Comaniciu, Dorin; Peter Meer. In: Mean Shift: A Robust Approach Toward Feature Space Analysis. IEEE Transactions on Pattern Analysis and Machine Intelligence 24 (5), pp. 603-619 (2002)), although other grouping approaches can be used as well.

The collision point can be compared to a predetermined, predefined, and/or preselected value defining an envelope or safety area around the camera. The area can be a convex area. Collision can be considered likely when the point of collision is within the envelope area and a collision can be considered not likely when the point of collision is outside the envelope area. In addition, likelihoods of collision for all groups of features in a set of images can be output no matter whether they are under or above the predetermined thresholds, such as for advanced decision making systems to plan for optimized operations and avoid short-sighted actions that may lead to collisions with new obstacles in the scene.

Figure 6:
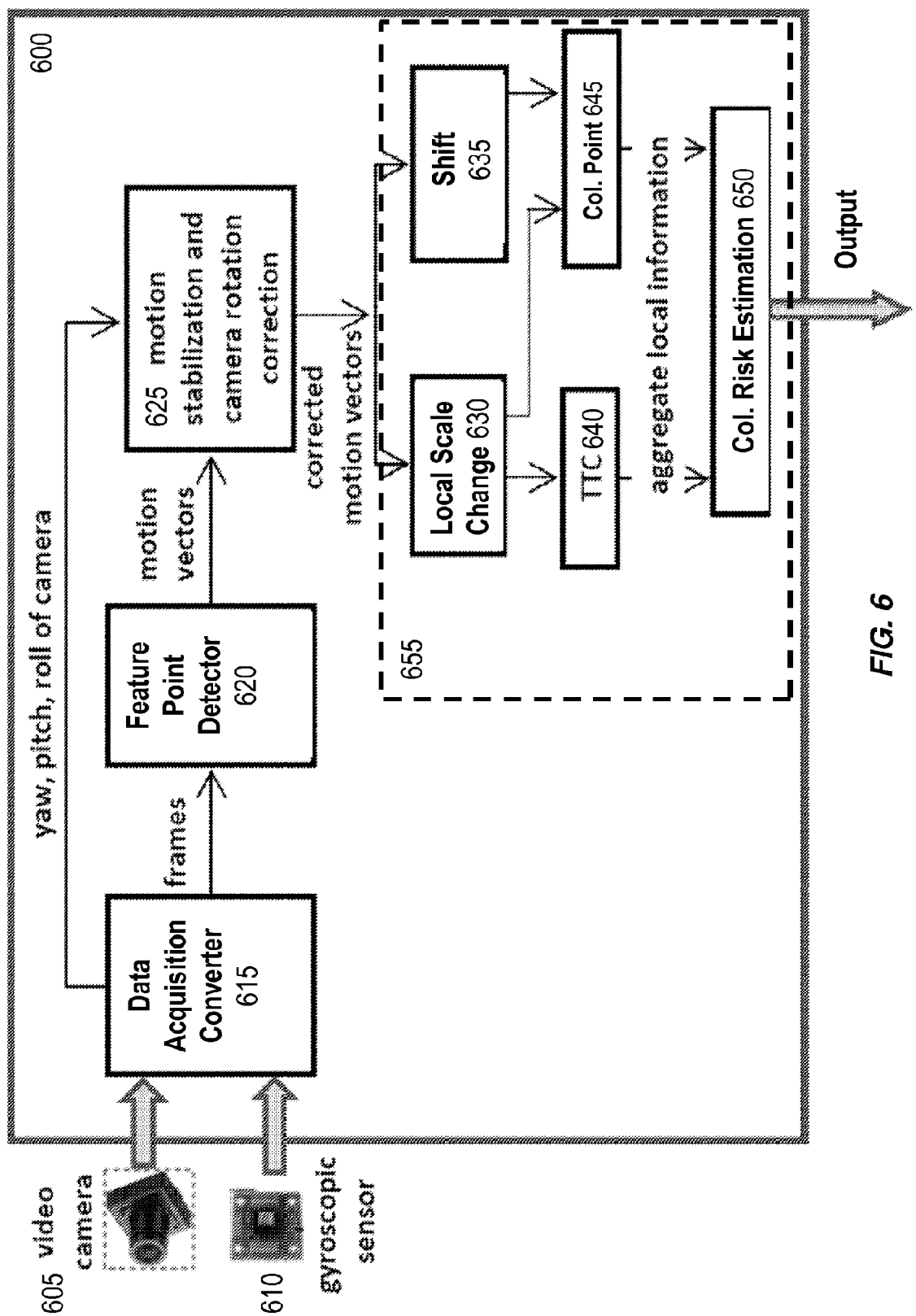
FIG. 6 is a system diagram of an example system for determining a collision risk estimate.

FIG. 6 is a system diagram 600 of an example system for determining a collision risk estimate. A monocular video camera 605 and a motion sensor 610 (e.g., a gyroscopic sensor) can capture videos and camera motion, respectively. A data acquisition converter 615 can synchronize the video and motion sensor data, and can perform data conversion (e.g., formatting and other initial data conditioning). For example, the data acquisition module 615 can convert the motion sensor velocity along the three axes into yaw, pitch, and roll angel displacements for an interval between two consecutive frames.

The frames can be passed to a feature point detector 620, which can perform feature detection and tracking (e.g., as described above) and provide motion information. The motion information can be in the form of motion vectors. Motion stabilization and camera rotation correction 625 can receive and compensate the motion vectors based on the camera rotation (e.g., based on the yaw, pitch and roll angles). Optionally, camera rotation can be determined without using the motion sensor 610 by using an appropriate algorithm, such as full field image motion analysis (Davison, Molton, Reid, and Stasse: MonoSLAM: Real-time single camera SLAM. In: IEEE Transactions on Pattern Analysis and Machine Intelligence, 2007, pp 1052-1067), although other algorithms may be used as well.

A collision-risk-estimator 655 can calculate or compute, based on the corrected motion vectors, the local scale change at 630, and translational shift at 635. Additionally, the collision-risk-estimator 655 can compute time to collision at 640 and collision point at 645. Finally, the collision-risk-estimator 655 can compute the collision risk estimation and generate collision warning at 650. A threshold can be separately predetermined, predefined, and/or preselected for time to collision and collision point, which in combination can define a temporal-spatial collision zone or envelope.

The following description provides an example related to computer-vision based collision risk assessment in collision detection and obstacle avoidance tasks. An approach is presented to determine collision risk for semi-rigid obstacles from videos obtained with an uncalibrated camera. Time to collision for an obstacle moving towards the camera was calculated using the ratio of its image size and its time derivative. In order to compute this ratio, local scale change and motion information obtained from detection and tracking of features was utilized. Using the same local scale change and motion information, a measure of collision point for obstacles moving along different trajectories relative to the camera optical axis was determined. Using videos of pedestrians captured in a controlled experimental setup, in which ground truth can be established, the accuracy of the collision risk estimation approach for different walking trajectories is demonstrated.

Figure 7:
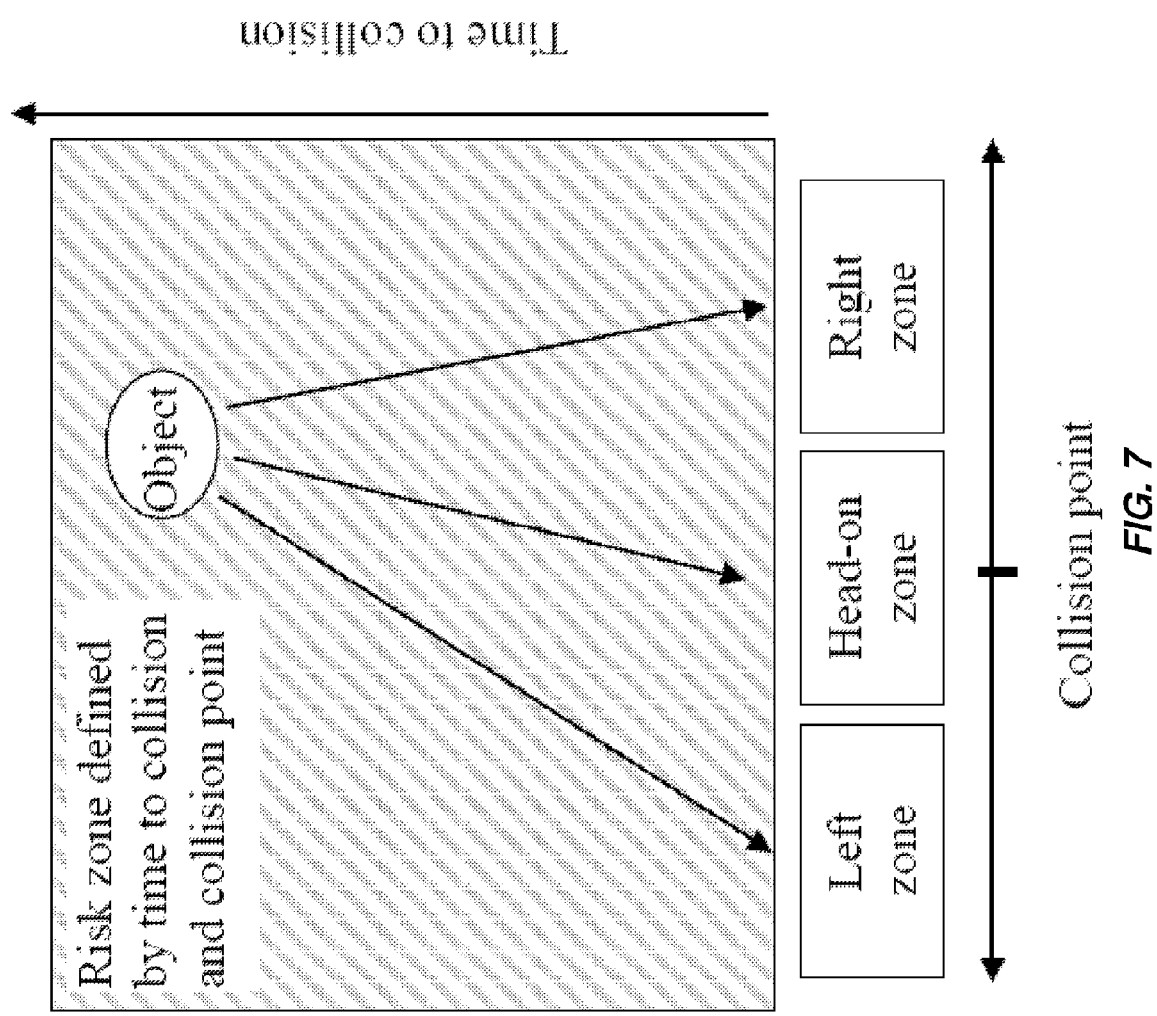
FIG. 7 is an illustration of the concept of collision risk zone depicting a scenario in which an object approaches the camera and can be classified into left, right and head-on zones.

FIG. 7 is an illustration depicting an example scenario in which an object approaches a camera's plane along 3 optional trajectories. The overall collision risk can be resolved into two concepts: collision point (the point at which the object makes impact on the camera plane) and time to collision (amount of time required by the object to reach the camera plane). A warning can be issued based on the time to collision and the projected collision point. If either estimation does not meet the collision risk criteria (e.g., which can be user defined), a warning may not be issued.

Time to collision is a quantity of interest to many fields, ranging from experimental psychology to robotics. Time to collision for two bodies in space can be the ratio of the distance between them and their relative speed. In the context of video cameras, time to collision can be defined as the time required for an object in the real world to reach the camera plane, assuming that the relative speed remains fixed during that time period. While time to collision can be the ratio of distance and speed, using a pinhole camera model, time to collision can become equivalent to the computation of the ratio of an object's size on an imaging plane to its time derivative. It has been suggested that analogous processing takes place in the human visual system while performing tasks involving time to collision computation, such as avoiding collisions or catching a moving object (Lee, D. N.: A theory of the visual control of braking based on information about time-to-collision Perception 5, 437-459 (1976); Tresilian, J. R.: Visually timed action: time-out for 'tau'? Trends in Cognitive Sciences 3, 301-310 (1999); Luo, G., Woods, R., Peli, E.: Collision judgment when using an augmented vision head mounted display device. Investigative Ophthalmology and Visual Science 50, 4509-4515 (2009)). In some implementations, time to collision can be determined by using image based data and object dilation over time and may not need to use measured physical quantities such as distance and velocity. The ratio of the object size in the image and its rate of expansion has been previously used for estimation of time to collision, for example, computing scale changes over a closed contour using image area moments (Cipolla, R., Blake, A.: Surface orientation and time to contact from divergence and deformation. In: Sandini, G. (ed.) ECCV 1992. LNCS, vol. 588, pp. 187-202. Springer, Heidel-berg (1992)), motion field (Ancona, N., Poggio, T.: Optical flow from 1d correlation: Application to a simple time to crash detector. International Journal of Computer Vision 14, 131-146 (1995)), or affine shape parameters (Alenya, G., Negre, A., Crowley, J. L.: A Comparison of Three Methods for Measure of Time to Contact. In: IEEE/RSJ Conference on Intelligent Robots and Systems, pp. 1-6 (2009)), and the like. Accurate initialization can be a challenge in using contours for determining the interest region in the image. This points toward a more general problem of accurately determining object size in the image in order to perform time to collision estimation.

Image segmentation and object recognition algorithms can be complex and can be computationally expensive. Erroneous segmentation can lead to inaccurate time to collision estimates. To overcome the difficulty of object size determination, time to collision estimation may be reformulated in terms of motion field and its derivatives (Meyer, F. G.: Time-to-collision from first order models of the motion field, IEEE Transactions on Robotics and Automation 10, 792-798 (1994); Camus, T. A.: Calculating time-to-contact using real time quantized optical flow. Max Planck-Institut fur Biologische Kybernetik Technical Report (1995)); image gradients (Horn, B. K. P., Fang, Y., Masaki, I.: Time to Contact Relative to a Planar Surface In IEEE Intelligent Vehicle Symposium, pp. 68-74 (2007); Horn, B. K. P., Fang, Y., Masaki, I.: Hierarchical framework for direct gradient-based time-to-contact estimation. In: IEEE Intelligent Vehicle Symposium, pp. 1394-1400 (2009)); residual motion from planar parallax (Lourakis, M., Orphanoudakis, S.: Using planar parallax to estimate the time-to-contact. In: IEEE Conference on Computer Vision and Pattern Recognition, vol. 2, pp. 640-645 (1999)); scaled depth (Colombo, C., DelBimbo, A.: Generalized bounds for time to collision from first order image motion. In: IEEE International Conference on Computer Vision, pp. 220-226 (1999)); scale invariant feature matching (Negre, A., Braillon, C., Crowley, J. L., Laugier, C.: Real time to collision from variation of intrinsic scale. In: Proceedings of the International Symposium on Experimental Robotics, pp. 75-84 (2006)); or solving parametric equations of object motion (Muller, D., Pauli, J., Nunn, C., Gormer, S., Muller-Schneiders, S.: Time to Contact Estimation Using Interest Points in IEEE Conference on Intelligent Transportation Systems, pp. 1-6 (2009)).

Some approaches assume that obstacles are planar rigid bodies in motion relative to the camera along its optical axis. Some approaches may be more appropriate when an entire plane moves with respect to the camera but produce inaccurate time to collision estimations when a smaller rigid body in front of a static background approaches the camera (e.g., using object segmentation and multi-scale fusion to improve time to collision estimation results, but still assumes the objects are rigid bodies). Such assumptions may fail in situations where semi-rigid obstacles such as pedestrians are involved. Another example challenge facing a typical time to collision estimation approach is with the case of object motion that is at an angle with the camera axis and not directly towards it. In addition to estimating the time to collision accurately for variety of motion trajectories, in applications like collision detection devices, it can be desirable to determine whether the obstacle moving along a trajectory would collide with the camera platform. This leads to the concept of a collision envelope or a safety zone around the camera, and any object trajectory with a potential to penetrate this zone can then be considered risky.

The example described herein provides an example approach for time to collision and collision risk estimation for semi-rigidly moving obstacles using feature points. The computation of time to collision can be based on local scale change. In addition to time to collision, the approach can also predict the collision point for a given object trajectory relative to the camera. The effectiveness of the approach is demonstrated using videos of pedestrians walking along different trajectories towards a sensing camera.

Processing in the example proceeds in the following manner. Detection and tracking of feature points can be performed on the input image sequence. Scale change computation can be performed in the neighborhood of each point feature, and a set of feature points where there is an increase in the local scale between two frames of a sequence can be obtained. The use of feature points and local scale change computation can provide flexibility to represent a semi-rigidly moving obstacle. From the features associated with the obstacle, time to collision and collision point are estimated. The neighborhood computation can be performed using a number of neighborhood definitions such as a spatial image window of a predefined size and Delaunay triangulation. The local scale change can be computed as the normalized change in the distance of the neighbors with respect to a central feature, or as the ratio of the difference of distances between all the points in the neighborhood between two frames. Alternatively, a rate of the change of the area of the local neighborhood between two frames can be used to obtain the local scale change information. The area of the local neighborhood can be computed as the number of pixels covered by the convex hull defined by the features in the local neighborhood. Another approach for computing the scale change can be to compute the affine matrix decomposition as defined by the features in the local neighborhood.

Figure 8:
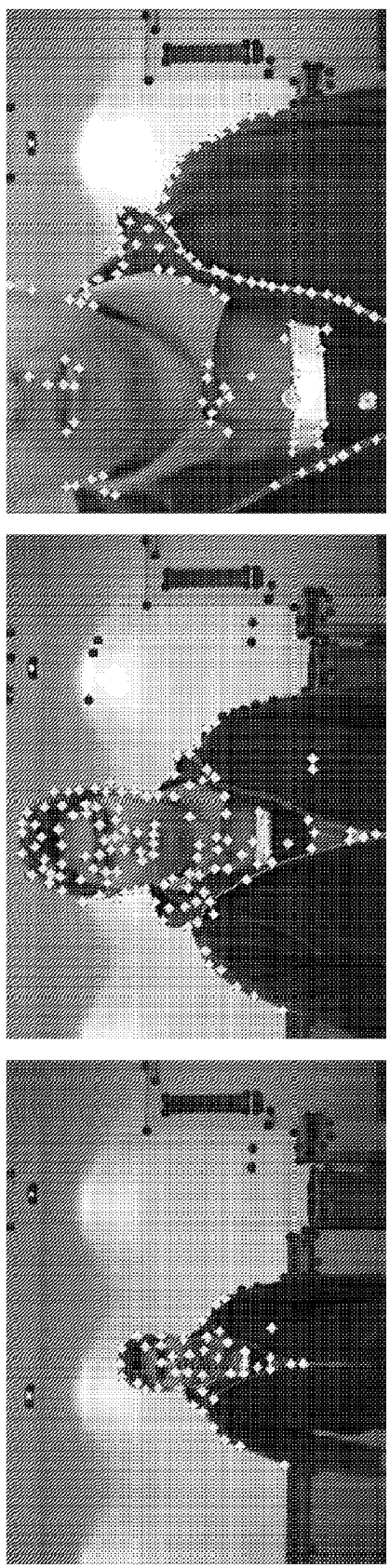
FIG. 8 is a series of images depicting example samples of feature detection in an image sequence in which a person approaches a stationary camera approximately along the optical axis.

FIG. 8 is a series of images depicting frames 50, 95, and 120 of a sequence in which a person walks approximately along a camera optical axis. Point features can be grouped as those belonging to the moving person (white diamonds) and the background (black asterisks). The grouping algorithms used in this example was the RANSAC algorithm. For a feature group, outliers were rejected. The example approach does not rely on explicit grouping of the features so as to represent one obstacle per group. If the grouping criterion is strict, then a single object can be divided into multiple feature groups, but the collision risk computation procedure can still remain the same with each feature group being treated separately and any one of the group can indicate an imminent collision threat.

Computation of the collision point can be based on a ratio of the local scale change and translation motion. The collision point value can be computed simply as the ratio of local scale change and lateral motion, or can be computed as the difference between collision trajectory and the camera center:

$$s = \frac{\Delta \varphi}{\Delta W} \cdot \frac{A}{d} - \frac{W \cos \varphi}{2f - W \sin \phi}$$

where A/d is the angular size of the object, W is the size of the object on the image sensor, ΔW is the rate of scale change, φ is the visual direction of the object, Δφ is the translation speed of the object, f is the camera focal length.

Experimental results are presented of testing the approach using videos of two pedestrians walking along different predefined trajectories, acting as potential obstacles for which time to collision and collision risk are estimated. A goal of such an experimental setup is to simulate real world conditions without use of synthetic sequences, while obtaining ground truth for quantitative comparison.

Figures 9A, 9B:
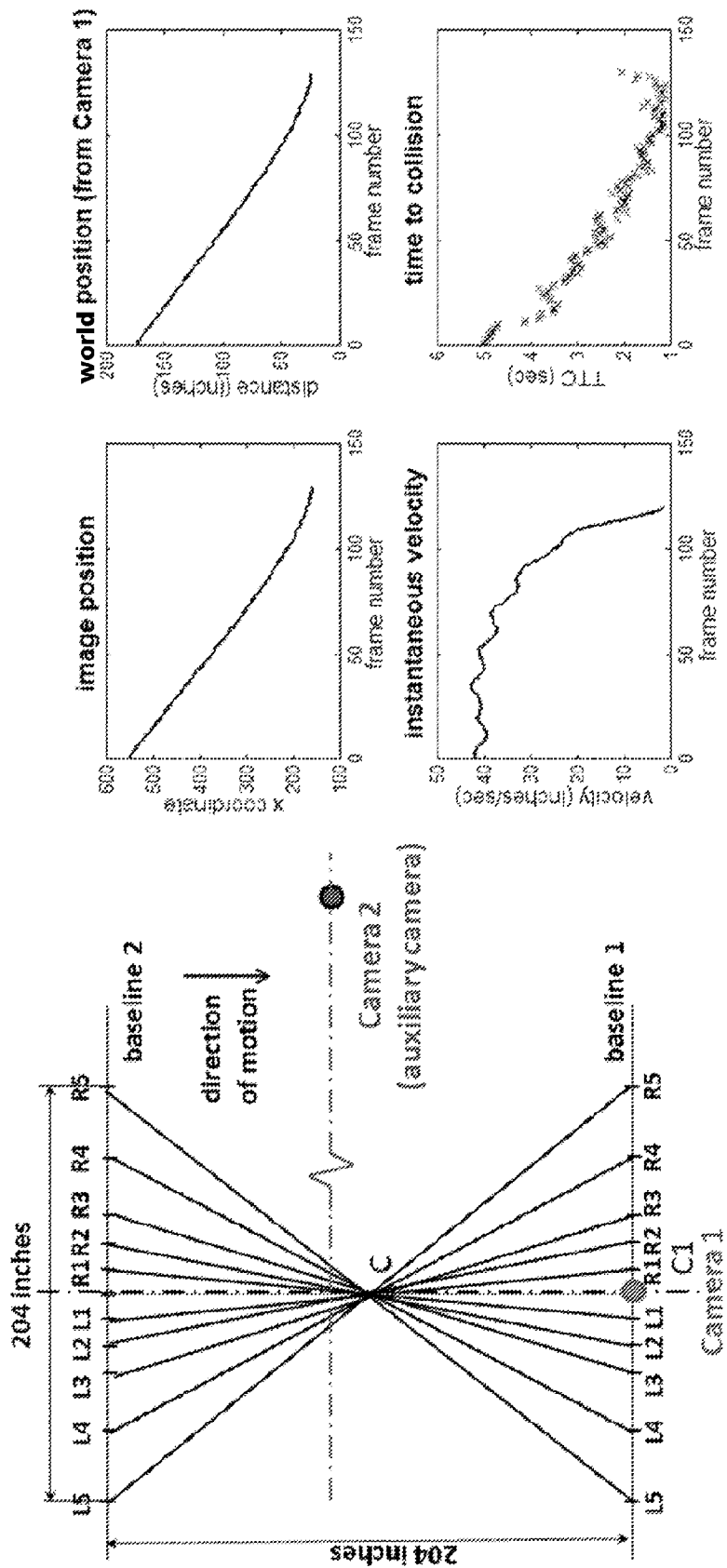
FIG. 9A is a diagram illustrating a schematic of an experimental setup.
FIG. 9B is a series of plots of intermediate quantities involved in determining the ground time to collision (TTC) values based on an auxiliary camera.

FIG. 9A shows a detailed schematic of the experimental setup of the example. The example setup includes two cameras capturing videos in a large room, approximately 20×80 feet. Camera 1 is set up at location C1 along baseline 1 to capture the videos to be processed by the estimation algorithm. Another baseline (baseline 2) established 204 inches (17 feet) away from baseline 1. A person walks along the 11 trajectories defined by lines R5-L5 to L5-R5, passing through a center point C, which is about 8.5 feet away from Camera 1. On each side of the optical axis of Camera 1, the five trajectories make increasing angles of 10, 20, 30, 37.5, and 45 degrees with the center line C-C1 (see FIG. 9A). While capturing the videos, the trajectory lines were not explicitly drawn on the floor. Only the points marked on the two baselines and the center point C were placed on the ground and these markers were used for guidance by the pedestrians. In order to obtain the ground truth world positions of the pedestrians with respect to Camera 1, profile views were captured simultaneously from Camera 2 (both the cameras are synchronized). The perpendicular distance between the line C-C1 and Camera 2 was about 58 feet. A larger distance minimizes the effect of depth for different trajectories and ensures a sufficiently large camera field of view (FOV) to cover the entire sequence of walks. All the physical distances in this setup were obtained from a standard measuring tape. FIG. 9B is a series of plots of intermediate quantities involved in determining the ground time to collision (TTC) values based on an auxiliary camera.

Figure 10A:
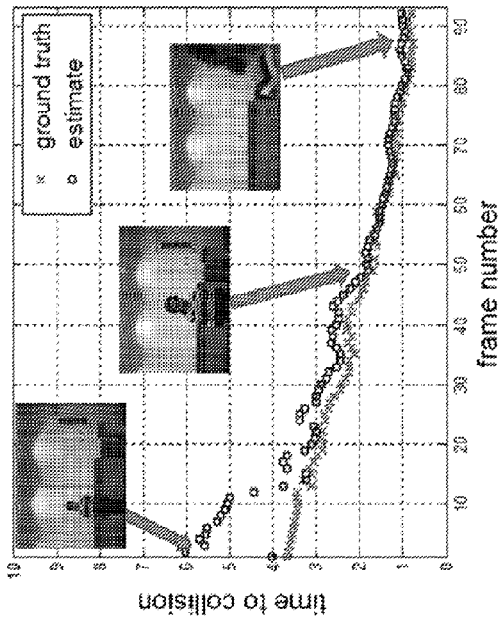
Figure 10B:
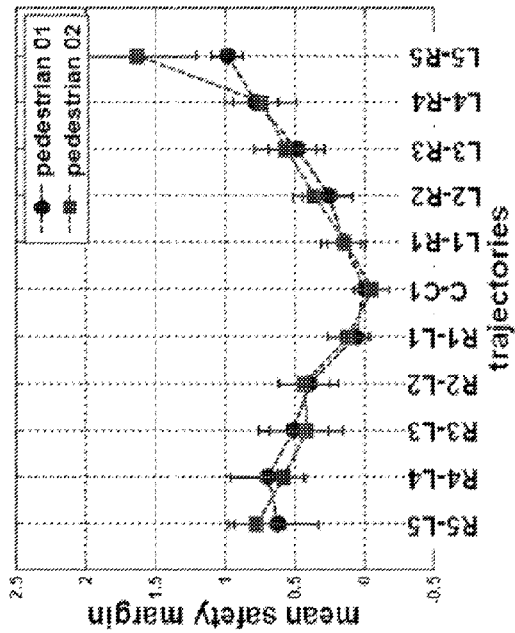
FIG. 10B is a plot showing a comparison of estimated TTC with ground truth TTC value for when a pedestrian walks with an angle of approximately 10 degrees with the optical axis.
Figure 10C:
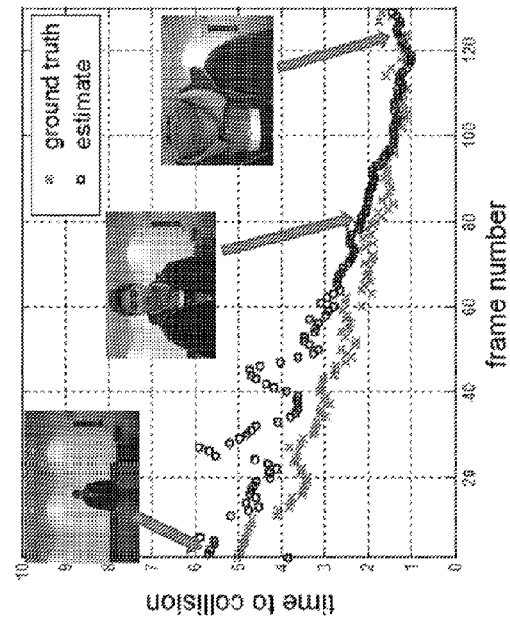
FIG. 10C is a plot showing a comparison of estimated TTC with ground truth TTC value for when a pedestrian walks with an angle of approximately 30 degrees with the optical axis.
Figure 10D:
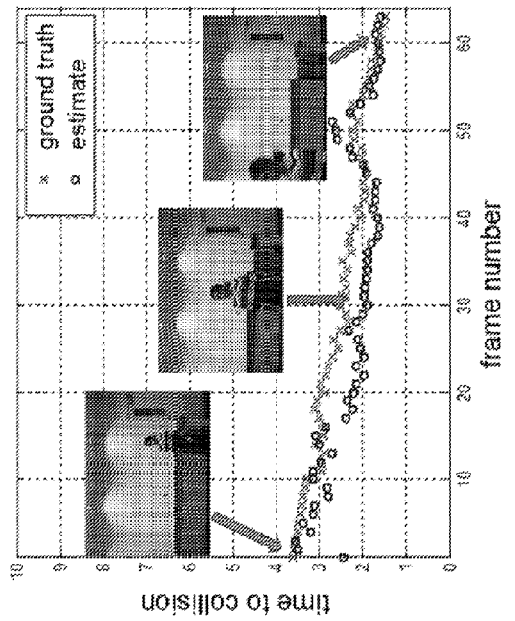
FIG. 10D is a plot showing a mean safety margin in terms of difference between collision point and camera center for each of the 11 walking trajectories in an experimental setup.

Time to collision estimation results of the algorithm along with the corresponding ground truth values for three trajectories (out of possible 22 for both the pedestrians) are shown in FIG. 10A-C. Each plot is superimposed with some frames of the corresponding sequence to show the change in the appearance of the pedestrian over time. The plot in FIG. 10A shows the case where the person approaches the camera head-on along the C-C 1 trajectory. FIGS. 10B and 10C show the results when the pedestrian walks with an angle of approximately 10 and 30 degrees with the optical axis, respectively. The estimated time to collision values follow the same trend as the ground truth-values. At lower time to collision ranges (as the relative distance between the pedestrian and the camera decreases), the estimates follow the ground truth more closely. This is a desired property because the estimates are preferably more accurate when the obstacle is perceived to be close to the camera. The example implementation can also handle variable relative velocity. At the very end of the C-C1 trajectory, the person slows down before coming to a halt. The estimated time to collision values start increasing corresponding to this change. FIG. 10D shows a plot of mean safety margin in terms of difference between collision point and camera center for each of the 11 walking trajectories. The curves in FIG. 10D show zero safety margin for the C-C1 trajectory, and increasing safety margins for the other trajectories. Also, FIG. 10A-D illustrates that even though the time to collision for different trajectories converge at relatively close values at the end of the run, the corresponding collision risk values are significantly different.

Although FIGS. 9A, 9B, 10A, 10B, 10C, and 10D depict example results, other results may be realized as well.

Without in any way limiting the scope, interpretation, or application of the claims appearing below, a technical effect of one or more of the example implementations disclosed herein may be that collision likelihood associated with time to collision and collision point can be obtained entirely from image based data and known camera parameters such as focal length and resolution, without having to measure physical quantities such as distance and velocity.

Without in any way limiting the scope, interpretation, or application of the claims appearing below, another technical effect of one or more of the example implementations disclosed herein may be that the need for complicated and computationally expensive camera calibration processes, 3D reconstruction of the scene, and camera motion estimation may be eliminated.

Without in any way limiting the scope, interpretation, or application of the claims appearing below, another technical effect of one or more of the example implementations disclosed herein may be that the current subject matter is suited for real-time systems, where quick decisions may have to be made in the face of impending collisions.

Without in any way limiting the scope, interpretation, or application of the claims appearing below, another technical effect of one or more of the example implementations disclosed herein may be that the current subject matter provides for a computationally achievable solution that can deal with a wide variety of obstacles by deemphasizing explicit obstacle recognition.

Without in any way limiting the scope, interpretation, or application of the claims appearing below, another technical effect of one or more of the example implementations disclosed herein may be that the current subject matter is more realistic because it does not assume that objects are planar and rigid, or that the entire plane is moving with respect to the camera.

Without in any way limiting the scope, interpretation, or application of the claims appearing below, another technical effect of one or more of the example implementations disclosed herein may be that the current subject matter may be suitable for multiple object scenarios.

Additionally, without in any way limiting the scope, interpretation, or application of the claims appearing below, another technical effect of one or more of the example implementations disclosed herein may be that the current subject matter may not rely on object recognition or segmentation, and may be computationally effective and may work for all visible obstacles.

Without in any way limiting the scope, interpretation, or application of the claims appearing below, another technical effect of one or more of the example implementations disclosed herein may be that the current subject matter may predict imminent collision coming from a wide range of directions, and may distinguish obstacles that are truly on a collision course from others that are just passing or have passed.

Without in any way limiting the scope, interpretation, or application of the claims appearing below, another technical effect of one or more of the example implementations disclosed herein may be that thresholds can be set at which operations such as warning, turning and slowing down can be executed for different applications.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
   receiving, from a video camera, data characterizing a plurality of digital video frames;
   detecting a plurality of features in each of the plurality of digital video frames;
   determining, from the detected features, a local scale change and a translational motion of one or more groups of features between at least a pair of the plurality of digital video frames, wherein the local scale change characterizes an inter-frame rate of expansion in an area defined by a convex hull of the one or more groups of features, wherein the translational motion characterizes an inter-frame difference in pixel position of a center of mass of the group of features;
   calculating a likelihood of collision, wherein the likelihood of collision is a ratio between the local scale change and the translational motion; and
   providing the likelihood of collision,
   wherein at least one of the receiving, detecting, determining, calculating, and providing is performed by at least one data processor forming part of at least one computing system.

2. The method of claim 1, wherein the translational motion is compensated based on the received data, wherein the received data further characterizes a motion of a camera, the motion being associated with the plurality of digital video frames.

3. The method of claim 1, further comprising:
   classifying one or more groups of features as being on a collision trajectory by comparing a collision point with a predetermined value defining a safety envelope around a camera.

4. The method of claim 1, wherein the computing system forms part of a wearable device, the method further comprising:
   providing an auditory warning to a wearer that collision is imminent.

5. The method of claim 1, wherein providing the likelihood of collision includes displaying, transmitting, persisting, or causing an auditory alarm to sound.

6. The method of claim 1, wherein the likelihood of collision characterizes a collision point as:

$$s = \frac{\Delta\varphi}{\Delta W} \cdot \frac{A}{d} - \frac{W\cos\varphi}{2f - W\sin\phi}$$

where A/d is an angular size of an object, W is a size of the object on the image sensor, $\Delta W$ is a rate of scale change, $\phi$ is a visual direction of the object, $\Delta\phi$ is a translation speed of the object, and f is a camera focal length.

7. A method comprising:
   receiving, from a video camera, data characterizing a plurality of digital video frames;
   detecting a plurality of features in each of the plurality of digital video frames;
   determining, from the detected features, a local scale change and a translational motion of one or more groups of features between at least a pair of the plurality of digital video frames, wherein the local scale change characterizes an inter-frame rate of expansion in an area defined by a convex hull of the one or more groups of features, wherein the translational motion characterizes an average of an inter-frame difference in pixel position of each feature in the group of features;
   calculating a likelihood of collision, wherein the likelihood of collision is a ratio between the local scale change and the translational motion; and
   providing the likelihood of collision,
   wherein at least one of the receiving, detecting, determining, calculating, and providing is performed by at least one data processor forming part of at least one computing system.

8. A non-transitory computer readable storage medium comprising executable instructions which when executed by at least one processor provides operations comprising:
   receiving, from a video camera, data characterizing a plurality of digital video frames;
   detecting a plurality of features in each of the plurality of digital video frames;
   determining, from the detected features, a local scale change and a translational motion of one or more groups of features between at least a pair of the plurality of digital video frames, wherein the local scale change characterizes an inter-frame rate of expansion in an area defined by a convex hull of the one or more groups of features, the translational motion characterizes an inter-frame difference in pixel position of a center of mass of the group of features or an average of an inter-frame difference in pixel position of each feature in the group of features;
   calculating a likelihood of collision, wherein the likelihood of collision is a ratio between the local scale change and the translational motion; and
   providing the likelihood of collision,
   wherein at least one of the receiving, detecting, determining, calculating, and providing is performed by the at least one data process, the at least one data processor forming part of at least one computing system.

9. The non-transitory computer readable storage medium of claim 8, wherein the translational motion is compensated based on the received data, wherein the received data further characterizes a motion of a camera, the motion being associated with the plurality of digital video frames.

10. The non-transitory computer readable storage medium of claim 8, further comprising:

classifying one or more groups of features as being on a collision trajectory by comparing a collision point with a predetermined value defining a safety envelope around a camera.

11. A system comprising:

at least one processor circuitry;

at least one memory storing instructions which, when executed by the at least one processor circuitry, causes operations comprising:

receiving, from a video camera, data characterizing a plurality of digital video frames;

detecting a plurality of features in each of the plurality of digital video frames;

determining, from the detected features, a local scale change and a translational motion of one or more groups of features between at least a pair of the plurality of digital video frames, wherein the local scale change characterizes an inter-frame rate of expansion in an area defined by a convex hull of the one or more groups of features, the translational motion characterizes an inter-frame difference in pixel position of a center of mass of the group of features or an average of an inter-frame difference in pixel position of each feature in the group of features;

calculating a likelihood of collision, wherein the likelihood of collision is a ratio between the local scale change and the translational motion; and providing the likelihood of collision, wherein at least one of the receiving, detecting, determining, calculating, and providing is performed by the at least one processor circuitry.

12. The system of claim 11, wherein the translational motion is compensated based on the received data, wherein the received data further characterizes a motion of a camera, the motion being associated with the plurality of digital video frames.

13. The system of claim 11, further comprising:

classifying one or more groups of features as being on a collision trajectory by comparing a collision point with a predetermined value defining a safety envelope around a camera.

* * * * *